Figure 1:
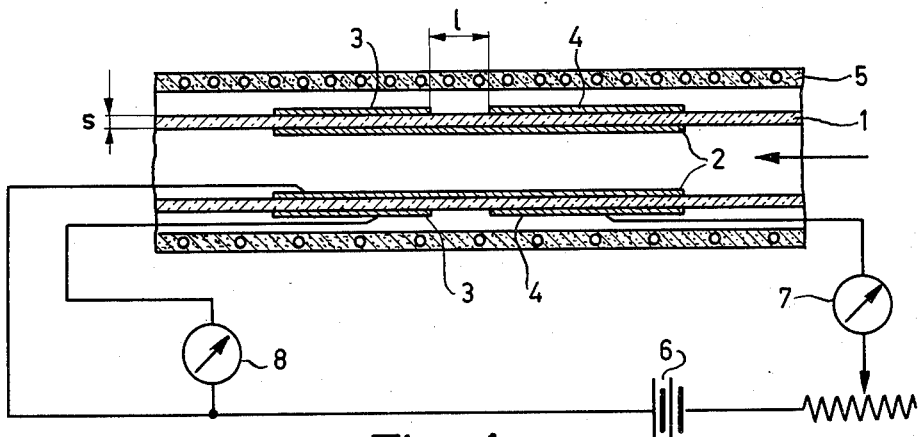

United States Patent [19]
Beekmans et al.

[11] 3,923,624
[45] Dec. 2, 1975

[54] APPARATUS FOR THE MEASURING AND SUPPLYING A CONTROLLED QUANTITY OF A GAS

[75] Inventors: Nicholaas Marinus Beekmans; Leopold Heijne, both of Eindhoven, Netherlands

[73] Assignee: U.S. Philips Corporation, New York, N.Y.

[22] Filed: Feb. 14, 1974

[21] Appl. No.: 442,472

[30] Foreign Application Priority Data
Mar. 28, 1973 Netherlands.................... 7304299

[52] U.S. Cl. .............................. 204/195 S; 204/1 T
[51] Int. Cl. ............................................. G01n 27/46
[58] Field of Search ......... 204/1 T, 195 S; 136/86 F

[56] References Cited
UNITED STATES PATENTS
3,216,911  11/1965  Kronenberg........................ 204/1 T
3,514,377  5/1970  Spacil et al....................... 204/195 S
3,525,646  8/1970  Tannenberger et al. ........... 136/86 F
3,654,112  4/1972  Beekmans........................ 204/195 S Primary Examiner—T. Tung
Attorney, Agent, or Firm—Frank R. Trifari; Ronald L. Drumheller

[57] ABSTRACT

Apparatus for measuring and supplying a controlled quantity of oxygen, which apparatus includes a partition wall formed of a solid which has a reversible reaction with oxygen molecules and is ion-conductive, said partition wall carrying electrodes for measuring and supplying a controlled quantity of oxygen while at the location of the gaps between the electrode pairs the partition wall is interrupted by a substance which has substantially no conductivity by means of oxygen ions.

7 Claims, 3 Drawing Figures

APPARATUS FOR THE MEASURING AND SUPPLYING A CONTROLLED QUANTITY OF A GAS

The invention relates to apparatus for measuring and supplying a controlled quantity of gaseous oxygen.

Such apparatus is described, for example, in British Pat. No. 1,229,610. It comprises a partition wall which is formed of a solid having a reversible reaction with oxygen molecules and being ion-conductive, said partition wall being provided on both of its surfaces with a thin metallic and/or semiconductive electrode layer, while one of the two electrode layers is electrically interrupted, one of the resulting parts being used as a measurement electrode and the other part as a controlled-supply electrode. An example of such a solid is stabilized zirconium oxide which is conductive by means of oxygen ions, while the electrodes may consist of a noble metal, such as platinum. The gaseous mixture the partial pressure of one of the components of which is to be measured is arranged on one side of the partition wall. On the other side of the wall there is a reference gas at a known constant partial pressure. The reference gas selected frequently is air. When the temperature is sufficiently high, displacement of the ions between an electrode pair produces a voltage difference $E$ which depends upon the ratio between the partial oxygen pressures $p1$ and $p2$ according to Nernst's law: $E = \text{const.} \log P1/P2$. The unknown pressure can be directly derived by measuring the E of one of the electrode pairs. The other electrode pair serves to supply gas to, or to withdraw gas from, a gaseous mixture in a controlled manner. Instead of measuring a voltage between the electrodes a current is supplied from one electrode to the other in this case. Whether oxygen is supplied to the gaseous mixture or withdrawn from it depends upon the direction of the current supplied. Faraday's law applies to the relation between the number of coulombs involved and the quantity $N$ of gas: $N = \text{const.} \, i.t$, where $i$ is the current and $t$ is the duration.

In order that the invention may be clearly understood and readily carried into effect, embodiments thereof will now be described by way of example with reference to the accompanying drawings, in which FIG. 1 shows a known apparatus, FIG. 2 an embodiment of an apparatus according to the invention, and FIG. 3 another embodiment thereof.

Referring now to FIG. 1, there is shown an apparatus for measuring and supplying a controlled quantity of oxygen which comprises a tube 1 made of a substance which is ion-conductive, for example stabilized zirconium oxide, a common inner electrode 2, a measuring electrode 3, a controlled supply electrode 4, an oven 5 in which the assembly is arranged, a current supply source 6, an ammeter 7 and a voltmeter 8.

In another embodiment the inner electrode 2 is split one part being disposed opposite the outer electrode 3 and the other part opposite the outer electrode 4.

As has been stated hereinbefore, the voltage between the measuring electrodes must depend only according to Nernst's law upon the oxygen pressures on either side of the partition wall. The current passed by the part of the tube 1 lying between the controlled-supply electrodes should not measurably influence this voltage. Because zirconium oxide is electrically conductive, in practice part of the voltage applied across the controlled-supply electrodes will always appear at the measurement electrodes. This effect, which may be referred to as "normal crosstalk," may be kept small by making the spacing l between the electrode pairs large compared with the thickness s of the partition wall (see FIG. 1). The absolute value of the spacing need not be large: for example with a ratio $l/s = 5$ the crosstalk factor is found to be less than 0.1 %. Normal crosstalk decreases about exponentially with $l/s$.

We have found that when direct current is used in some cases a much larger crosstalk voltage is produced than is to be expected on the ground of the conductivity of the material of the partition wall. This phenomenon, which may be referred to as "anomalous crosstalk," was found to be due to polarization phenomena at the controlled-supply electrodes. Polarization is the phenomenon wherein an opposing E.M.F. builds up at the electrode when the electrode passes current. This effect is particularly marked when high current densities are used. Moreover at a given current density it greatly depends upon the nature of the electrode and in particular of the interface between the electrode and the electrolyte. Electrodes which exhibit this effect in a small degree are referred to as "reversible" electrodes, and those in which the effect is stronger are referred to as "polarizing" or even "blocking" electrodes.

The use of zirconium oxide was found to give rise to intense polarization or blocking when the electrode forms a continuous layer impermeable to oxygen. An optimally reversible electrode should be highly permeable to oxygen. The latter property can be achieved in the case of a substance which in itself is impermeable to oxygen, such as platinum, by using it in the form of a finely divided porous layer. Obviously the particles of the layer must be in good electrical contact with one another, but at the same time a considerable part of the partition wall (zirconium oxide) must be exposed to enable oxygen to be taken up or given off. On the other hand, however, high-rate transfer of electrons must be possible between the metal and the oxygen ions which move through the zirconium oxide and which just have assumed or left the gaseous state in the form of atoms or molecules.

In practice polarization shows itself as an additional voltage with respect to the voltage to be expected on the ground of the resistance and Ohm's law to cause a given current to flow through the electrolyte via the electrode. This additional voltage concentrates as a steep voltage drop in the immediate vicinity of the polarized electrode.

Anomalous crosstalk does substantially not occur in an embodiment of the measurement and controlled-supply apparatus in which both the inner electrode and the outer electrode are split, the electric circuits connected to the split electrode pairs having no direct electric contact with one another. However, in practice this embodiment cannot readily be manufactured in many cases. If, for example, the partition wall has the form of a small-diameter tube it is difficult to locate the gap by which the inner electrode is split in accurate register with the outer gap. Furthermore the spacing required to reduce the "normal" crosstalk voltage which occurs in any case to a value below the permissible limit value may be too large, for example because the resulting travel time of the gas is too large. In addition, in order to fully utilize the splitting of the two electrode layers the measuring circuit must be completely separated from the controlled-supply circuit. The latter requirement has consequences with respect to the electric circuit which are not always acceptable. It gives rise to complexity especially in automatic measuring and regulating apparatus in which the dosing current flowing through the dosing electrodes is controlled by the voltage across the measurement electrodes. The complete electrical separation may then be avoided by using as the input stage of the measuring and regulating amplifier a differential amplifier which must have a high rejection factor and a very low input current.

The invention enables, while eliminating the influence of "anomalous" crosstalk, an apparatus to be used which has a common counter electrode for the measurement and controlled-supply circuits. The said apparatus permits the use of a simple amplifier.

According to the invention an apparatus for measuring and supplying a controlled quantity of oxygen, which apparatus includes a partition wall formed of a solid which has a reversible reaction with oxygen molecules and is conductive by means of oxygen ions, said partition wall being provided on both surfaces with a thin metallic and/or semiconductive electrode layer, while one of the two electrode layers is electrically interrupted, one part being used as a measurement electrode while the other part is used as a controlled-supply electrode, is characterized in that at the location of the gap in the electrode layer the partition wall is interrupted by the interposition of a layer of a substance in which the conduction by oxygen ions is negligibly small as compared with that in the material of the partition wall.

In practice a tube made of $ZrO_2$ is cut into two parts which then are joined again with the interposition of such a substance. The said substance may, for example, be a metal, such as platinum. The electric conductivity of platinum is completely electronic; compact platinum is not permeable to oxygen in the form of a gas or of ions. Since the stabilized zirconium oxide is electrically conducting by means of oxygen ions only, an intimate contact between zirconium oxide and platinum sheet does not give rise to short-circuiting of the voltage difference set up across the zirconium oxide.

Alternatively the two parts made of zirconium oxide may be joined by means of a melting ceramic, a glass or a glass ceramic.

In a preferred embodiment of the apparatus according to the invention the metal which is interposed between the two electrode halves and the conduction of which by means of oxygen ions is negligibly small as compared to that of the material of the partition wall may also be used as electric lead-through member for the inner electrode.

The joint between the metal and the substance which is ion-conductive is established by means of a material generally referred to as a melting ceramic (see G. H. Jonker et al. in G. H. Stewart "Science of Ceramics" Academic Press, London 1965). In practice use may for example be made of a melting ceramic of the composition, expressed in per cent by weight, $Al_2O_3$—18, $SiO_2$—40.5 and $CaO$—41.5. The joint is made by applying a suspension of the said oxide mixture to the two tube ends to be joined, drying it and subsequently heating the tube ends together with an interposed ring of platinum to a temperature of 1,375°C. During this heating the oxide mixture melts and wets both platinum and $ZrO_2$, so that after cooling a gas-tight joint is obtained. The leakage of oxygen through the tube in this embodiment at an elevated temperature (of about 1,000°K) was found to be as small as the leakage through a tube including no platinum ring and is normal for stabilized zirconium oxide at the said temperature. In this embodiment there is no measurable crosstalk when the electrode spacing 1 is twice the wall thickness ($s$, see FIG. 1).

Another possibility of establishing a strong joint between the platinum ring and the two tube halves consists in using a combination of chemical pressure and temperature, as described by J. T. Klomp in Am.Cer.-Soc. Bull. 51, 683 (1972). It was found that at a temperature of 1,550°C a good compression bond between platinum and stabilized zirconium oxide is obtained.

An important use of the apparatus according to the invention is in the "COD" meter described in U.S. Pat. No. 3,819,499.

Figure 2:
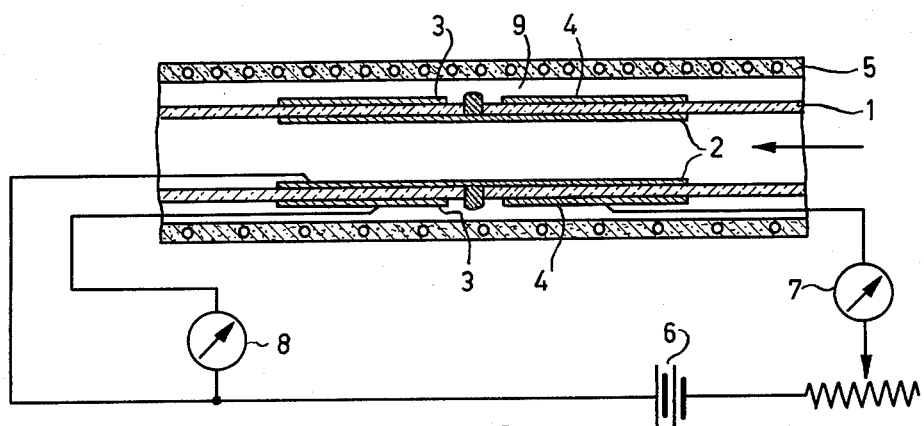
Figure 3:
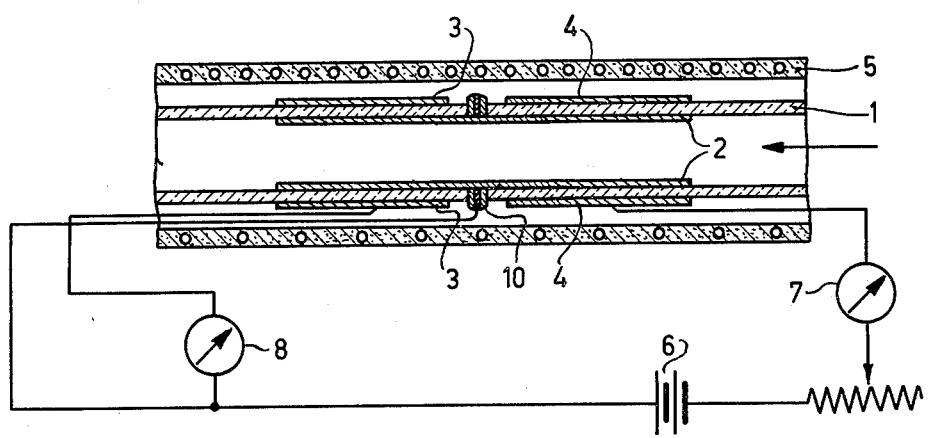

The two last-mentioned embodiments are shown diagrammatically in FIGS. 2 and 3. In FIG. 2 reference numeral 9 denotes the interposed member which may be a platinum ring, a melting ceramic, a glass or a glass ceramic. FIG. 3 shows the embodiment in which a metal in combination with a metling ceramic 10 is used as a lead-through member for the inner electrode 2.

What is claimed is:

1. Apparatus for measuring and controlling the partial pressure of oxygen, comprising:

first and second axially aligned tubular conduit sections of a material capable of conducting electricity predominately by the transfer or migration of oxygen ions;

a third tubular conduit section aligned with and spacing said first and second tubular conduit sections and forming therewith a tubular conduit cell, said third tubular conduit section being of a material which is substantially not capable of conducting electricity by the transfer or migration of oxygen ions;

first and second electrode layers substantially covering the outside surface respectively of said first and second tubular sections;

a third electrode layer substantially covering the inside surface of said first, second and third tubular sections;

voltage measuring means electrically connected between said first and third electrode layers for measuring the difference between partial oxygen pressures inside and outside of said tubular conduit cell; and means electrically connected between said second and third electrode layers for applying a voltage therebetween to cause oxygen to be transferred into or out of said tubular conduit cell.

2. Apparatus as defined in claim 1 wherein said third tubular conduit section is of a ceramic material.

3. Apparatus as defined in claim 1 wherein said first and second electrode layers are electrically spaced from the outside surface of said third tubular conduit section.

4. Apparatus as defined in claim 3 wherein said third tubular conduit section is of metal.

5. Apparatus as defined in claim 4 wherein said third tubular conduit section electrically connects with said third electrode layer and forms an electrical lead-through member thereto.

6. Apparatus as defined in claim 5 wherein said first and second tubular conduit sections are made of stabilized zirconium oxide and said third tubular conduit section and said first, second and third electrode layers are of platinum.

7. Apparatus as defined in claim 6 wherein the platinum elements are bonded to the stabilized zirconium oxide elements with a ceramic compound.

* * * * *

UNITED STATES PATENT AND TRADEMARK OFFICE
CERTIFICATE OF CORRECTION

PATENT NO. : 3,923,624
DATED      : December 2, 1975
INVENTOR(S) : NICOLAAS MARINUS BEEKMANS It is certified that error appears in the above—identified patent and that said Letters Patent are hereby corrected as shown below:

In the title page, section [75], "Nicholaas" should be

--Nicolaas--

Signed and Sealed this

Fourteenth Day of December 1976

[SEAL]

Attest:

RUTH C. MASON
*Attesting Officer*

C. MARSHALL DANN
*Commissioner of Patents and Trademarks*